United States Patent
Ying et al.

(10) Patent No.: US 9,529,790 B2
(45) Date of Patent: Dec. 27, 2016

(54) HIERARCHICAL PAGE TEMPLATES FOR CONTENT PRESENTATION IN A DIGITAL MAGAZINE

(71) Applicant: Flipboard, Inc., Palo Alto, CA (US)

(72) Inventors: Charles Ying, San Mateo, CA (US); Filipe Fortes, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 211 days.

(21) Appl. No.: 13/938,227

(22) Filed: Jul. 9, 2013

(65) Prior Publication Data

US 2015/0019943 A1    Jan. 15, 2015

(51) Int. Cl.
  *G06F 17/00*  (2006.01)
  *G06F 17/24*  (2006.01)
  *G06F 17/21*  (2006.01)

(52) U.S. Cl.
  CPC ........... *G06F 17/248* (2013.01); *G06F 17/211* (2013.01); *G06F 17/212* (2013.01)

(58) Field of Classification Search
  CPC .............................. G06F 17/211; G06F 17/212
  See application file for complete search history.

(56) References Cited

U.S. PATENT DOCUMENTS

| | | | |
|---|---|---|---|
| 5,895,477 A * | 4/1999 | Orr | G06F 17/211 715/202 |
| 5,956,737 A * | 9/1999 | King | G06F 17/211 707/E17.121 |
| 6,771,801 B1 | 8/2004 | Fisher et al. | |
| 6,826,727 B1 | 11/2004 | Mohr et al. | |
| 7,028,255 B1 | 4/2006 | Ayers | |
| 7,272,789 B2 * | 9/2007 | O'Brien | 715/247 |
| 7,472,340 B2 * | 12/2008 | Burago | G06F 17/212 715/227 |
| 7,500,188 B1 * | 3/2009 | Trapani | G06F 17/211 715/238 |
| 7,644,356 B2 * | 1/2010 | Atkins | G06F 17/211 715/243 |
| 7,747,947 B2 | 6/2010 | Balinsky | |
| 7,814,116 B2 | 10/2010 | Hauser | |
| 8,060,830 B2 | 11/2011 | Kahn et al. | |

(Continued)

OTHER PUBLICATIONS

Nguyen, Vinh-Tiep, et al, "Augmented Media for Traditional Magazines," SoICT'12: Proceedings of the Third Symposium on Information and Communication Technology, Aug. 2012, pp. 97-106.*

*Primary Examiner* — Laurie Ries
(74) *Attorney, Agent, or Firm* — Fenwick & West LLP

(57) ABSTRACT

A digital magazine server creates a section of a digital magazine including content items based on a page template describing the relative positioning and sizing of content items. A page template may include display regions specifying the size of content items as a percentage of a display area. Additionally, a display region in a page template may specify use of a sub-template for presenting content items. The sub-template includes display regions specifying the relative positioning of content items presented in the display region specifying use of the sub-template. To generate the section of the digital magazine, various page templates are scored and a page template is selected based on the scoring. One or more diversity policies may be enforced when selecting the page template to improve user interaction with the digital magazine.

14 Claims, 11 Drawing Sheets

(56) References Cited

U.S. PATENT DOCUMENTS

| | | | |
|---|---|---|---|
| 8,307,288 B1* | 11/2012 | Smaltz | 715/733 |
| 8,423,889 B1* | 4/2013 | Zagorie et al. | 715/255 |
| 8,612,851 B2* | 12/2013 | Kiefer | 715/243 |
| 8,620,021 B2* | 12/2013 | Knudson et al. | 382/100 |
| 9,053,190 B1* | 6/2015 | Boenau | G06F 17/30867 |
| 9,152,616 B2* | 10/2015 | Ying | G06F 17/2247 |
| 2002/0059327 A1* | 5/2002 | Starkey | G06F 17/30893 |
| 2003/0237046 A1* | 12/2003 | Parker et al. | 715/513 |
| 2004/0078759 A1 | 4/2004 | Ohashi et al. | |
| 2004/0252340 A1* | 12/2004 | Komagamine et al. | 358/1.18 |
| 2005/0039119 A1* | 2/2005 | Parks | G06F 17/211 715/209 |
| 2005/0055635 A1* | 3/2005 | Bargeron | G06F 17/248 715/251 |
| 2005/0268279 A1 | 12/2005 | Paulsen et al. | |
| 2006/0107204 A1 | 5/2006 | Epstein | |
| 2006/0143556 A1* | 6/2006 | Elkady | G06F 17/212 715/209 |
| 2006/0168514 A1 | 7/2006 | Tokunaga | |
| 2006/0279555 A1 | 12/2006 | Ono | |
| 2007/0198915 A1* | 8/2007 | Hiyama | G06F 17/212 715/234 |
| 2007/0214409 A1 | 9/2007 | Miyata | |
| 2007/0255811 A1 | 11/2007 | Pettit et al. | |
| 2007/0266328 A1* | 11/2007 | Vasey | 715/762 |
| 2007/0294238 A1 | 12/2007 | Citron et al. | |
| 2008/0189609 A1 | 8/2008 | Larson et al. | |
| 2009/0249177 A1 | 10/2009 | Yamaji et al. | |
| 2009/0265611 A1* | 10/2009 | Sengamedu | G06F 17/30905 715/234 |
| 2009/0307583 A1 | 12/2009 | Tonisson | |
| 2009/0313538 A1* | 12/2009 | Kitada | G06F 17/248 715/243 |
| 2010/0005380 A1 | 1/2010 | Lanahan et al. | |
| 2010/0040286 A1* | 2/2010 | Matsuzawa | G06F 17/248 382/173 |
| 2010/0083077 A1 | 4/2010 | Paulsen et al. | |
| 2010/0115399 A1 | 5/2010 | Kohar et al. | |
| 2010/0325528 A1* | 12/2010 | Ramos, Sr. | G06F 17/211 715/230 |
| 2011/0082749 A1 | 4/2011 | Rivlin et al. | |
| 2011/0249903 A1* | 10/2011 | Duga | G06T 11/60 382/217 |
| 2011/0276349 A1* | 11/2011 | Huang et al. | 705/3 |
| 2011/0283210 A1 | 11/2011 | Berger et al. | |
| 2012/0036427 A1 | 2/2012 | Oasaka et al. | |
| 2012/0042240 A1 | 2/2012 | Oliveira et al. | |
| 2012/0102095 A1 | 4/2012 | Campbell et al. | |
| 2012/0159314 A1 | 6/2012 | Schrier et al. | |
| 2012/0179780 A1 | 7/2012 | Spring et al. | |
| 2012/0254733 A1* | 10/2012 | Tucovic | G06F 17/24 715/243 |
| 2012/0294514 A1 | 11/2012 | Saunders et al. | |
| 2013/0007586 A1 | 1/2013 | Thomas | |
| 2013/0024757 A1 | 1/2013 | Doll et al. | |
| 2013/0339907 A1* | 12/2013 | Matas | G06T 11/60 715/853 |
| 2014/0173405 A1* | 6/2014 | Ferrara et al. | 715/223 |
| 2015/0151913 A1* | 6/2015 | Wong | B07C 5/3412 700/214 |

* cited by examiner

HIERARCHICAL PAGE TEMPLATES FOR CONTENT PRESENTATION IN A DIGITAL MAGAZINE

BACKGROUND

This disclosure relates generally digital magazines, and more particularly to dynamically determining a layout for presentation of content items in a digital magazine on a client device using flexible page templates.

Publishers of digital content struggle to optimize presentation of content on different devices with different display areas, different display resolutions, or differences in other display characteristics. Determining techniques for selecting content for a user and adapting the selected content for presentation to the user on a particular device create resource and performance challenges for a publisher. Additionally, the rapidly increasing number and variety of devices used to present content makes it impractical for publishers to continue to create content layouts customized to individual devices. Moreover, to maintain user engagement with content, publishers must efficiently use computing resources to prevent optimization of content presentation from negatively impacting a user's viewing experience.

SUMMARY

A digital magazine server creates a digital magazine for a user including content items for presentation to a user. The digital magazine server organizes content items having at least one common characteristic into various sections, and presents content items to the user according to the sections. To improve user interaction with content items, the digital magazine server maintains various page templates describing a spatial arrangement of content items relative to each other in a section ("layout") for presentation to a user. A page template includes one or more display regions that are each configured to present one or more content items. The position of display regions relative to each other in a page template specify the position of content items relative to each other in a section generated from the page template.

One or more display regions in a page template may specify the size of content items displayed in a page of the digital magazine (also referred to as a "section") using a percentage of a display area or a range of dimensions of a portion of the display area to specify the size of the content items displayed in a page. For example, various display regions in a page template are associated with one or more dimensions specified as a percentage of a reference dimension, such as a height or width specified as a percentage of a height or width of a display area in which a section is displayed. As another example, a display region is associated with an aspect ratio specified as a percentage of a display area in which a section is displayed.

To allow greater customization in presentation of content items, a display region of a page template may indicate that a sub-template is used to present content items. A sub-template includes one or more display regions that are each configured to present one or more content items. The position of display regions relative to each other in a page template specify the position of content items relative to each other in a section generated from the page template. A display region of a page template may identify a specific sub-template that is used to determine the relative positioning and sizing information of content items presented via the display region. Alternatively, a display region of a page template may indicate that content items in the display region are presented based on a sub-template, so a sub-template is selected when the page template is selected and the selected sub-template is used to present content items in the display region. Additionally, a display region of a page template identifies a group of sub-templates, and a sub-template is selected from the identified group when the page template is selected and used to present content items in the display region.

A user of the digital magazine server requests presentation of content items provided by one or more sources from the digital magazine server or from a digital magazine application executing on a client device. The request includes information describing the display area in which the section of the digital magazine is presented. For example, the request includes the physical dimensions of the client device on which the section of the digital magazine is to be presented. Based in part on the display area, one or more candidate page templates are selected. For example, page templates having at least one display region with one or more physical dimensions less than a threshold value are not identified as candidate page templates. Hence, page templates that would present content items using dimensions that would make viewing or interacting with the content items difficult are not identified as candidate page templates.

The candidate page templates may be scored based on the display area of the client device for presenting the section and ranked based on their associated scores. For example, scores are based on characteristics of the content items to be presented, characteristics of the display regions in various candidate page templates, the display area in which the content items are to be presented, as well as any other suitable data. For example, the amount of modification of content items to present the content item in display regions of a candidate page template is reflected in a score for the candidate page template. Types of content items and associations between display regions in a candidate page template may also affect the scores of candidate page templates. Based at least in part on the ranking, a page template is selected and used to present content items in the section.

Additionally, page template selection may account for other factors to present the user with content items presented using various page templates. In one embodiment, scores associated with page templates are modified based on previous selection of page templates. For example, a score associated with a page template is reduced if the page template was previously selected within a threshold time interval of the current time; similarly, a score associated with a page template is reduced if the page template was previously selected greater than the threshold time interval of the current time. Characteristics of the content items to be presented and various page templates may also be used to modify a score associated with a page template. For example, if the content items to be presented include at least one content item having a specified type, a score associated with a page template including a single display region associated with the specified type of content item is increased. The ranking of page templates may be modified based on modified scores associated with page templates and a page template is selected from the modified ranking.

If the selected page template includes a display region identifying use of a sub-template to present content items, the sub-template is selected and used to present content items in the corresponding display region. Various sub-templates may be scored and a display sub-template selected based on the scores. Methods for selecting a page template may be used to select the display sub-template. If a specific sub-template is identified by the display region of the selected page template, rather than select a sub-template based on scores associated with various sub-templates, the specific sub-template is selected. Similarly, if the display region of the selected page template identifies a group of sub-templates, the display sub-template is selected from the identified group based on scores associated with sub-templates in the group or based on any other suitable factor.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, a tablet computer, or any other suitable computing system) and presented to the user. For example, based on selections made by the user or on behalf of the user, the digital server application generates a digital magazine including one or more sections having content items retrieved from a number of sources and personalized for the user. The generated digital magazine allows the user to more easily consume content that interests and inspires the user by presenting content items in an easily navigable print-style magazine interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
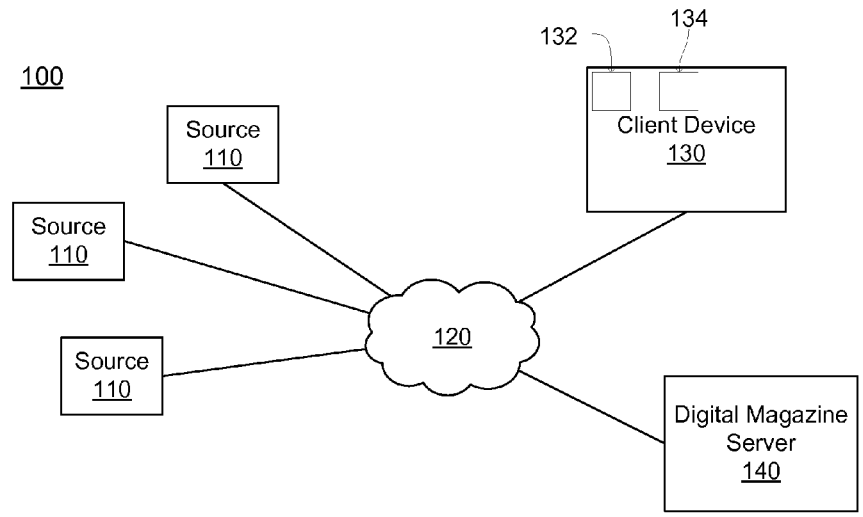
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein may be adapted to online systems that are not digital magazine servers 140.

A source 110 is a computing system capable of providing various types of content to a client device 130. For purposes of illustration, content provided by a source is also referred to herein as a "content feed." Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone, a tablet computer, or another suitable device.

In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an active matrix liquid crystal display (AM-LCD), an organic light emitting diode (OLED) display, or any other suitable device. Different client devices 130 may have display devices 132 with different characteristics. For example, different client devices 130 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, in some embodiments, the client device 130 may include multiple input devices 134. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates sections in a digital magazine by processing the received content, and provides the sections to the client device 130. As further described below in conjunction with FIG. 2, the digital magazine server 140 generates one or more sections for presentation to a user based on content items obtained from one or more sources 110 and information describing organization and presentation of content items. For example, the digital magazine server 140 determines a page layout specifying positioning of content items relative to each other based on information associated with a user and generates a section including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 reduces the amount of user interaction with the client device 130 for accessing various content items.

Figure 2:
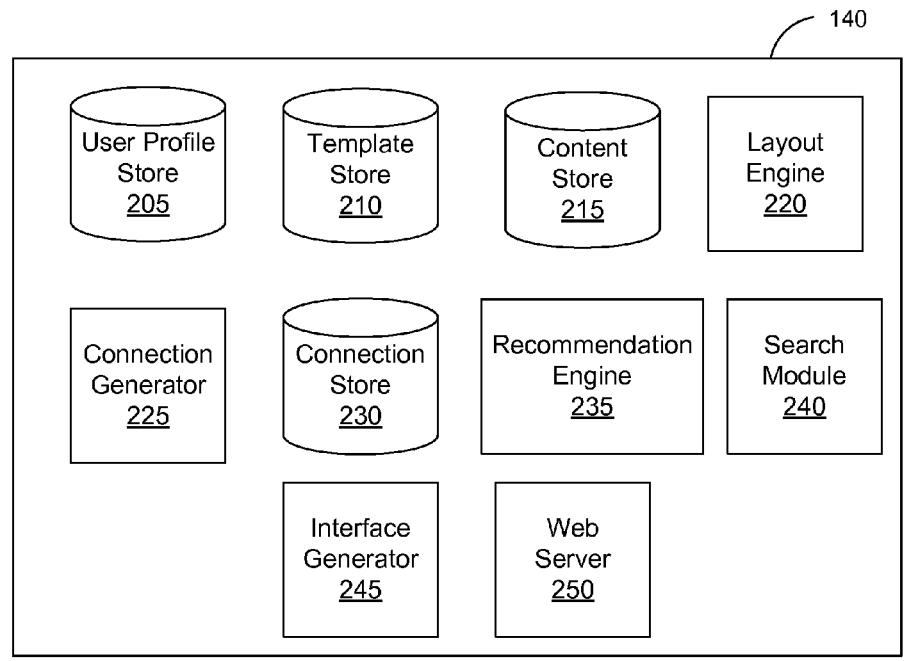
FIG. 2 is a block diagram of a digital magazine server, in accordance with an embodiment of the invention.

FIG. 2 is a block diagram of an architecture of the digital magazine server 140. In the example shown by FIG. 2, the digital magazine server 140 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding digital magazine server user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement of content items relative to each other on a section ("layout") for presentation by a client device 130. A page template includes one or more display regions, each configured to present one or more content items. In some embodiments, display regions in a page template may be configured to present a particular type of content item or to present a content item having one or more specified characteristics. For example, a display region in a page template is configured to present an image while another display region in the page template is configured to present text data. Each display region has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of sections presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

In various embodiments, page templates included in the template store 210 may be defined with flexible dimensions, allowing presentation of content items to account for various sizes or dimensions of a display area in which the content items are presented. For example, a page template includes display regions specifying a percentage of a display area in which a content item is presented. Specifying a percentage of a display area for presentation of a content item allows a page template to present content items across a range of display areas and to provide consistent presentation of content items when a display area is resized. Page templates with display areas specified as percentages of a display area are further described below in conjunction with FIGS. 3, 4, and 5A-5F.

In some embodiments, the template store 210 includes one or more sub-templates that specify positions of content items relative to each other. A sub-template includes one or more display regions specifying sizing of content items and positioning of content items relative to each other. A display area in a page template may specify selection of a sub-template for presentation of content items within the display area. For example, a display region of a page template identifies a sub-template, allowing content items presented in the display region to be positioned relative to each other as specified by a sub-template. To improve presentation of content items, a sub-template used to present content items in a display region is selected when a page template including the display region is presented. For example, various sub-templates in the template store 210 are scored based on the display area in which content items are presented and characteristics of the content items to be presented. Based on the scores, a display sub-template is selected and used to present content items within the display region of the page template. This optimizes presentation of content items in the display region by selecting a sub-template in which content items are displayed in a format that facilitates user interactions. Alternatively, a source 110 or a user of the digital magazine server 140 associates a specific sub-template with a display area of a template, allowing the source 110 or user to customize presentation of content items in a display area of the template. Use of sub-templates to present content items is further described below in conjunction with FIG. 7.

The content store 215 stores objects that each represents various types of content. For example, the content store 215 stores content items received from one or more sources 110 within a threshold time of a current time. Examples of content items stored by the content store 215 include a page post, a status update, a photograph, a video, a link, an article, a photograph, video data, or any other type of content. A user may specify a section including content items having a common characteristic, and the common characteristic is stored in the content store 215 along with an association with the user profile of the user specifying the section.

The layout engine 220 retrieves content items from one or more sources 110 or from the content store 215 and generates a section including the content items based on a page template from the template store 210. Based on the retrieved content items, the layout engine 220 may identify candidate page templates from the template store 210, score the candidate page templates based on characteristics of the display regions in different candidate page templates, based on previously-selected templates, and based on characteristics of the content items. Based on the scores associated with candidate page templates, the layout engine 220 selects a page template and associates the retrieved content items with one or more display regions to generate a section where the retrieved content items are presented relative to each other and sized based on their associated display regions. The layout engine 220 may use the display area of the client device 130 on which content items are to be presented when selecting a page template from the candidate page templates. In some embodiments, the layout engine 220 enforces one or more diversification policies when selecting templates to provide the user with content items arranged based on different page templates. Use of diversification policies is further described below in conjunction with FIG. 6. When associating a content item with a display region, the layout engine 220 may associate the content item with a display region configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

If a display region of the selected template specifies a sub-template, the layout engine 220 retrieves a specified sub-template from the template store. Alternatively, the layout engine 220 scores various sub-templates retrieved from the template store 210 based on characteristics of the content items, positioning and sizing of display regions within the sub-templates, and the display area of the client device 130 on which the content items are to be presented. Based on the scores associated with various sub-templates, the layout engine 220 selects a sub-template specifying sizing and relative positioning of content items presented within the display region identifying the sub-template.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. In one embodiment, the connection generator 225 determines a connection confidence value between a user and an additional user of the digital magazine server 140 based on the user's and the additional user's interactions with content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Example attributes of content items include a type (e.g., image, story, link, video, audio, etc.), a source 110 from which a content item was received, time when a content item was retrieved, and subject matter of a content item. Example characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion of a search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items from various sources 110, groups (or sections) of content items, and user profile information. In one embodiment, the index includes information about various content items, such as author, source, topic, creation date/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 134 of a client device 130 with modifications to content presented by a digital magazine. As an example, if the input device 134 is a touch-sensitive display, the interface generator 245 includes instructions associating different gestures with navigation through content items presented by a digital magazine. Instructions from the interface generator 245 are communicated to a digital magazine application or other application executing on a client device 130 on which content from the digital magazine server 140 is presented. Inputs received via an input device 134 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating sections of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS® or RIM®.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the digital magazine server 140 generates a user-defined section of the digital magazine including content items satisfying a search query provided by a user and sends the user-defined section to the client device 130 for presentation to one or more users. In another example, a digital magazine application executing on the client device 130 receives a search query from the user and generates the user-defined section of the digital magazine. Alternatively, the digital magazine server 140 and the client device 130 operate in conjunction with each other to generate the user-defined section of the digital magazine. For example, certain functionality (e.g., identifying content items from sources 110 satisfying a search query) is performed by the digital magazine server 140, while other functionality (e.g., selecting a template for presenting a user-defined section of the digital magazine) is performed by a digital magazine application executing on the client device 130.

Page Templates

Figure 3:
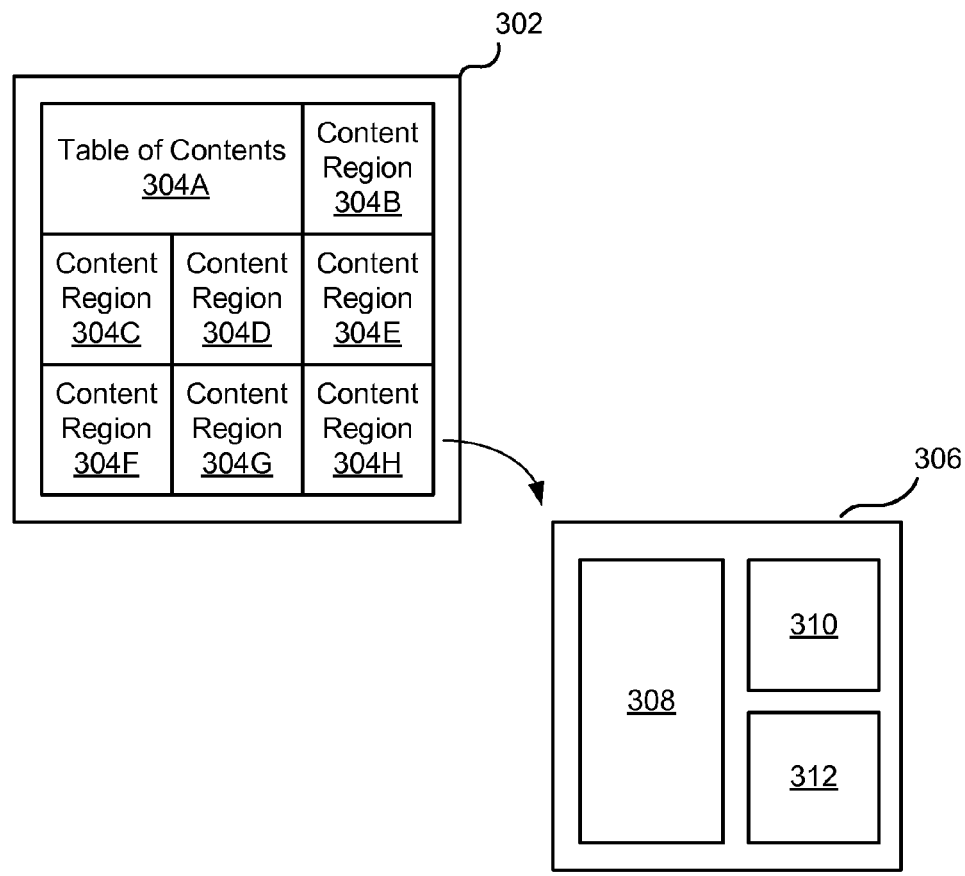
FIG. 3 is an example of presentation of content items in a digital magazine using a page template, in accordance with an embodiment of the invention.

FIG. 3 illustrates an example page template 302 having multiple rectangular display regions each configured to present a content item. In one embodiment, the page template 302 is arranged as a two dimensional grid divided into of rows and columns, which define display regions for displaying content items. The rows and columns may have uniform width or may have different widths. The widths of the rows and columns may be specified using a number of pixels, distance, or other suitable unit of measure that describes the location of information on a display the client device 130. Other page templates with different configurations of display regions may be used by the digital magazine server 140 to present one or more content items received from sources 110. As described above in conjunction with FIG. 3, in some embodiments, one or more display regions in a page template are reserved for presentation of content items having specific characteristics or for presentation of a specific type of content item. In one embodiment, the size of a display region is specified as a fixed aspect ratio or using fixed dimensions (e.g., a 6 column region with 20 pixels separating each column). In another embodiment, a display region is specified as a rectangle, or other region, having a specified dimension at a specified location (e.g., a rectangle 200 pixels wide and at location (x, y), where x represents the number of pixels along a first axis as measured from the top left corner of the display and y represents the number of pixels along a second axis that is orthogonal to the first axis as measured from the top left corner of the display). As described above, the size of a display region may also be specified as a percentage of a display area. For example, a page template specifies an aspect ratio of a display area as a percentage of a reference dimension or specifies one or more dimensions of a display area as a percentage of a reference dimension.

Additionally, display regions in a page template may be specified hierarchically, where a display region identifies a sub-template from the template store 215 specifying location and sizing information for content items presented in the display region. As described above, a sub-template includes one or more display regions that specify sizing and positioning of content items relative to each other, and a display region in a sub-template may identify a sub-template for presenting content items. This allows greater customization of presentation of content items in a digital magazine. For example, a page template is organized hierarchically, where display regions within the page template identify sub-templates for presenting content items. A seven column page template, for example, may be divided into two sub-templates (e.g., 4-column and 3-column sub-templates, 5-column and 2-column sub-templates, 6-column and 1 column sub-templates, etc.) or any suitable number of sub-templates arranged in permutations of seven columns.

In the example of FIG. 3, when a digital magazine server 140 generates a section for presentation to a user, the digital magazine server 140 populates display regions in a page template 302 with content items. Information identifying the page template 302 and associations between content items and display regions in the page template 302 is stored and used to generate the section. For example, to present a section to a user, the layout engine 220 identifies the page template 302 from the template store 210 and retrieves content items from one or more sources 110 or from the content store 215. The layout engine 220 generates data or instructions associating content items with display regions within the page template 302. Hence, the generated section includes various "content regions" presenting one or more content items associated with a display region in a location specified by the display region.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and display regions in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a section presenting the content items based on the layout described by the display regions of the page template. For example, in FIG. 3, the section 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Selecting Page Template for Presenting Content Items

Figure 4:
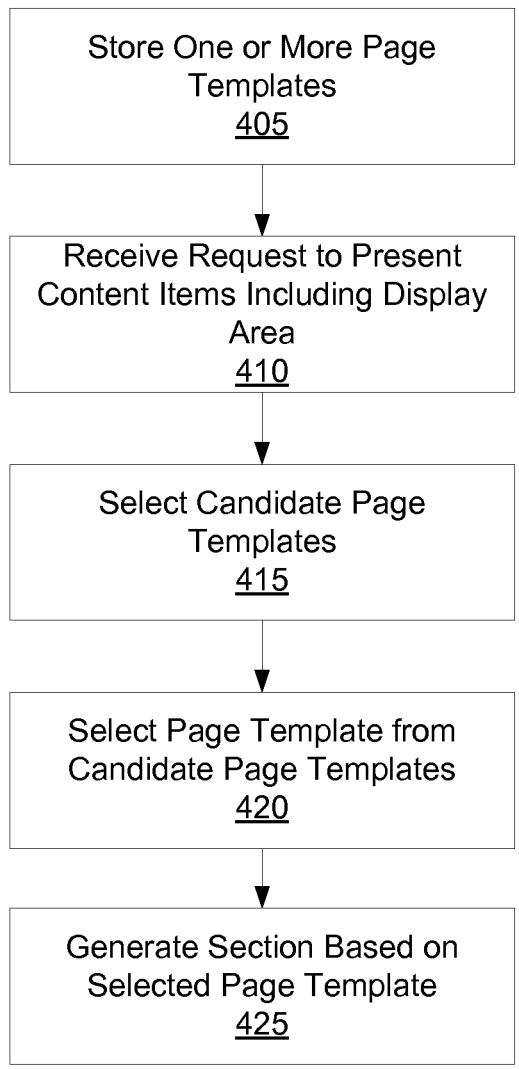
FIG. 4 is a flow chart of a method for presenting content items in a digital magazine based on a page template, in accordance with an embodiment of the invention.

FIG. 4 is a flow chart of one embodiment of a method for presenting content items in a digital magazine based on a page template. The digital magazine server 140, or a digital magazine application executing on a client device 130, stores 405 one or more page templates. For example, one or more page templates are stored in the template store 215. As described above in conjunction with FIGS. 2 and 3, a page template describes a spatial arrangement of content items relative to each other on a section ("layout") for presentation by a client device 130. A page template includes one or more display regions that are each configured to present one or more content items. The position of display regions relative to each other in a page template specify the position of content items relative to each other in a section generated from the page template.

In one embodiment, display regions in a page template are associated with a percentage of a display area to specify the size of the content items displayed in a section. For example, various display regions are associated with one or more dimensions specified as a percentage of a reference dimension, such as a height or width specified as a percentage of a height or width of a display area in which a section is displayed. As another example, a display region is associated with an aspect ratio specified as a percentage of the display area in which a section is displayed. Specifying the size of display regions as a percentage of a display area allows the size of the content items displayed based on the display regions to be easily modified as the display area changes in size. Additionally, one or more display regions in a page template may have fixed dimensions, so the size of content items presented based on fixed-dimension display regions remains unchanged as the display area presenting the section changes in size.

The digital magazine server 140, or a digital magazine application executing on a client device 130, receives 410 a request to present content items from one or more sources 110 via a digital magazine. Information describing the display area of the client device 130 is included in the request. For example, physical dimensions of a display device 132 of the client device 130 are included in the request. In some embodiments, information describing the resolution of the display device 132 is included in the received request. The request may additionally include information identifying one or more characteristics of the content items for presentation. Example characteristics of the one or more content items include: one or more source identifiers, a keyword associated with the content items, a user associated with the content items, and a time interval associated with the content items.

Based at least in part on the display area of the client device, one or more candidate page templates are selected 415 from the stored page templates. For example, using information in the received request to present content items, physical dimensions for display regions in each of the stored page templates are determined; page templates having at least one display region with one or more physical dimensions less than a threshold value are not identified as candidate page templates. Hence, page templates that would present content items using dimensions that would make viewing or interacting with the content items difficult are not identified as candidate page templates. As another example, various page templates partition a display area into one or more columns, each of the various page templates is compared to information about the display area from the received requests. The columns may be specified using percentages of the display area or using specified physical dimensions. Page templates having a number of columns capable of being presented in the display area with at least a threshold physical size are selected 415 as candidate page templates, while page templates having one or more columns not capable of being presented in the display area with at least the threshold physical size are not selected as candidate page templates. For example, a display area may be unable to present more than 5 columns that each have a threshold physical size, so page templates including more than 5 columns are not selected as candidate page templates, while page templates with 5 or fewer columns are selected 415 as candidate page templates. In one embodiment, a digital magazine application executing on the client device 130 from which the request to present content items was received 410 selects 415 the candidate page templates after retrieving page templates from the digital magazine server 140 or from a storage device local to the client device 130; alternatively, the digital magazine server 140 selects 415 the candidate page templates from the template store 215.

From the candidate page templates, a display page template is selected 420. As further described below in conjunction with FIG. 6, scores are generated for each of the candidate page templates, and a page template is selected 420 based at least in part on the scores. In various embodiments, the scores are based on characteristics of the content items to be presented, characteristics of the display regions in various candidate page templates, the display area of the display device 132 on which the content items are to be presented, as well as any other suitable data. For example, the amount of modification of content items to present the content item in display regions of a candidate page template is reflected in a score for the candidate page template. Types of content items and associations between display regions in a candidate page template and content item types may also influence the score of the candidate page template. Diversity of page templates may be enforced when selecting 420 a page template, as further described below in conjunction with FIG. 6. For example, scores of specific candidate page templates are increased or decreased based on how recently they were selected or based on characteristics of the candidate page templates or display regions within the candidate page templates.

Using the display page template, the digital magazine server 140 or a digital magazine application executing on the client device 130 generates 425 a section including the content items from one or more sources 110. The generated section includes content regions presenting one or more content items having locations relative to each other specified by the display regions in the selected page template. Additionally, the sizes of various content regions are determined from the sizes of display regions in the selected page template from which a corresponding content region is generated. In one embodiment, the digital magazine server 140, or a digital magazine application executing on the client device 130, dynamically arranges and sizes one or more content regions including one or more content items relative to each other based on the selected page template.

In one embodiment, a size of a content region is modified based on the location of the content region within the display area if the content region presents a content item having a specified type. For example, if a content region is displaying an image and is within a threshold distance of a boundary of the display area, the content region is increased to a size where a border of the content region is within the threshold distance of the display area boundary. Increasing the size of certain content regions based on the type of presented content items allows users to more easily view or interact with certain content items, increasing user interaction with content items presented via the digital magazine.

As further described in conjunction with FIGS. 5A-F, after the section is generated 425 and presented to a user via the client device 130, the size of display area available for presenting the section may be modified. For example, the section is displayed in a window of a laptop computer and a user or application modifies the size of the window displaying the section. Information including the modified size of the display area is communicated to a digital magazine application executing on the client device 130, which selects 415 candidate page templates, as described above, based on the modified size of the display area. A page template is selected 420 and used to generate 425 a modified section based on the modified size of the display area, as described above. Hence, the layout of a section may be dynamically modified as the display area available for presenting the section is modified, increasing user engagement with the presented content items.

In one embodiment, the presentation of a content item is modified based on the size of a content region of the selected page template for displaying the particular content item. For example, if the text to be included in a content region is greater than a threshold area of a content region of a selected template, the text is reduced to a size where the entire text can be displayed within the target content region of the selected template. Known techniques for modifying attributes of a content item may be employed to reduced text, an image, video, or other content items such that the modified content item is suitable for presentation in a target content region. Using the selected page template, the digital magazine server 140 presents a section that includes the modified content item along with any selected unmodified content items. Modifying the size of certain content items based on the area of the target content region in a selected template allows the digital magazine server 140 to make a rough selection of a page template and then modify the size of the content item based on the area of a target content region. In turn, the digital magazine server 140 can more easily select a page template and generate a section based on the selected template.

Figure 5A:
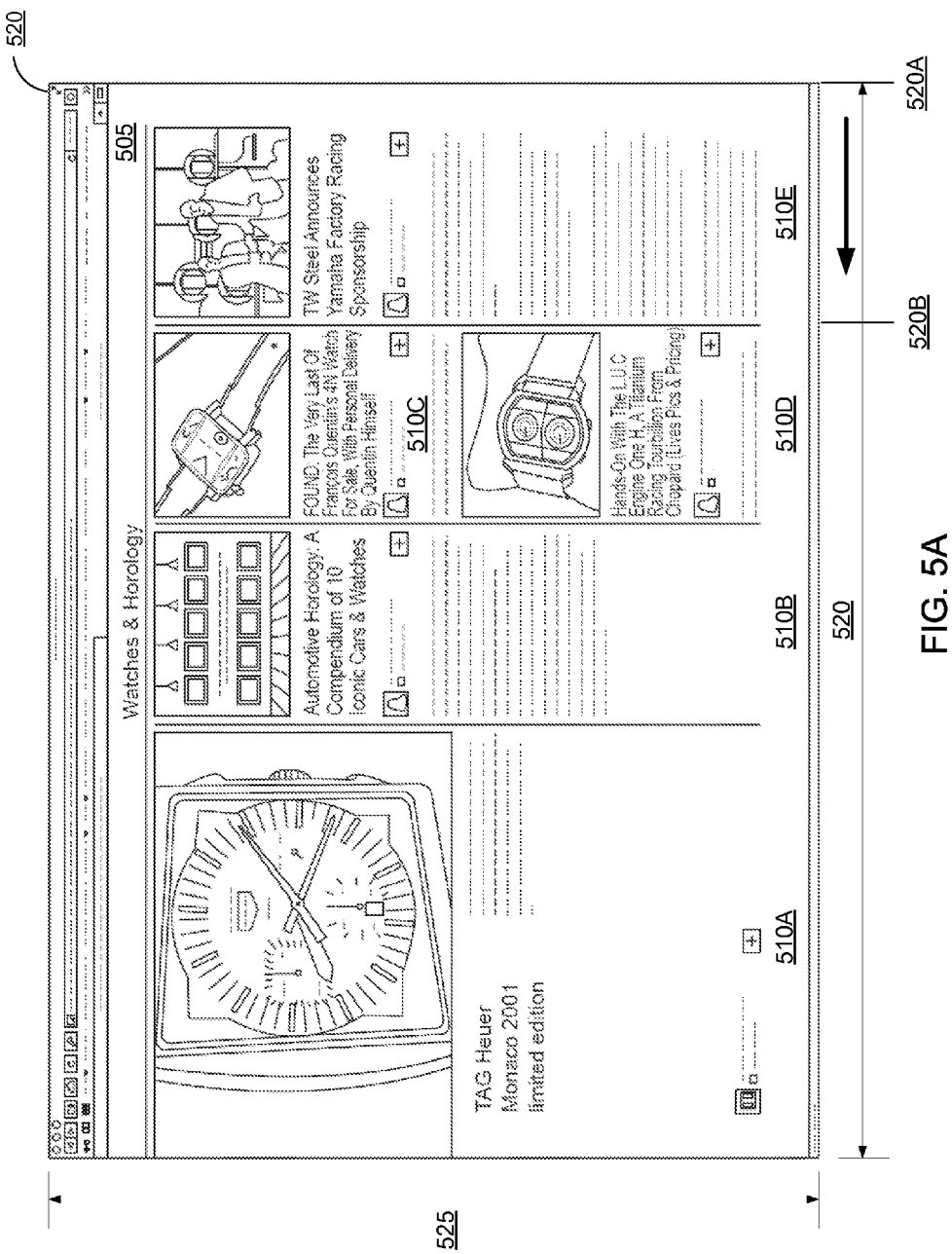
FIGS. 5A-5F are examples of modifying presentation of content items in a digital magazine using a dynamically adjustable page template as the display area available for presenting the content items is modified, in accordance with an embodiment of then invention.
Figure 5B:
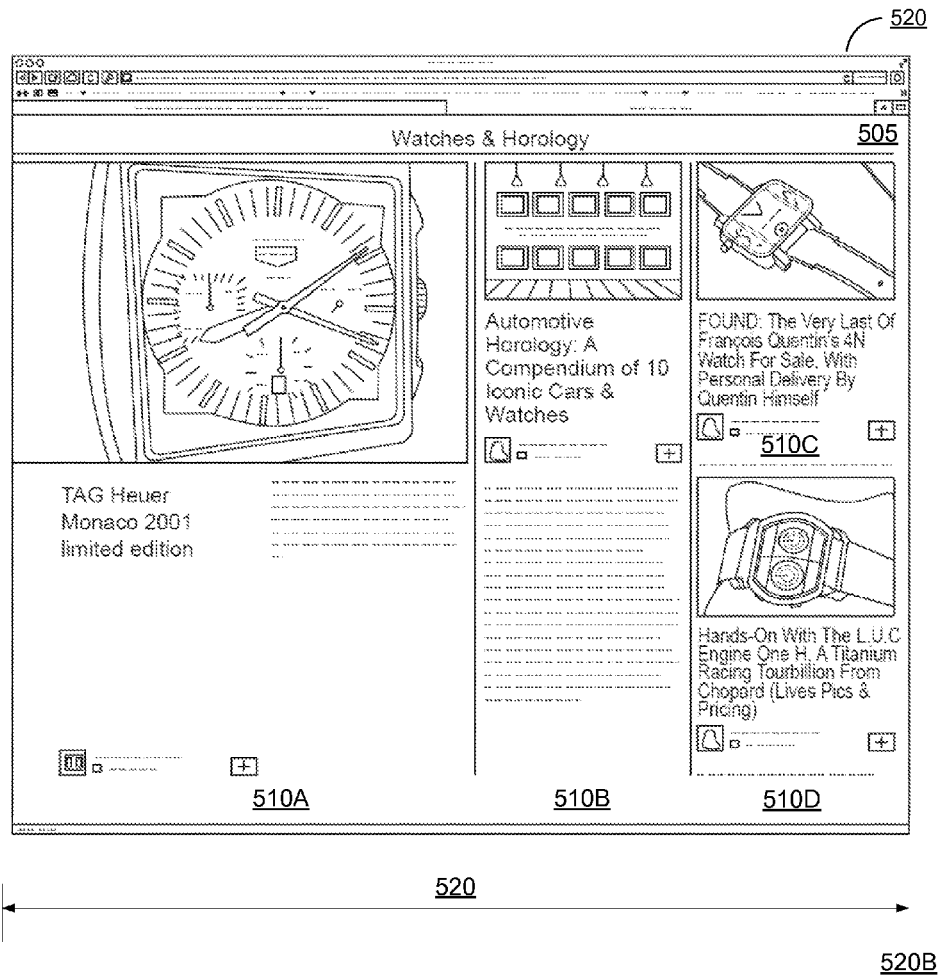
Figure 5C:
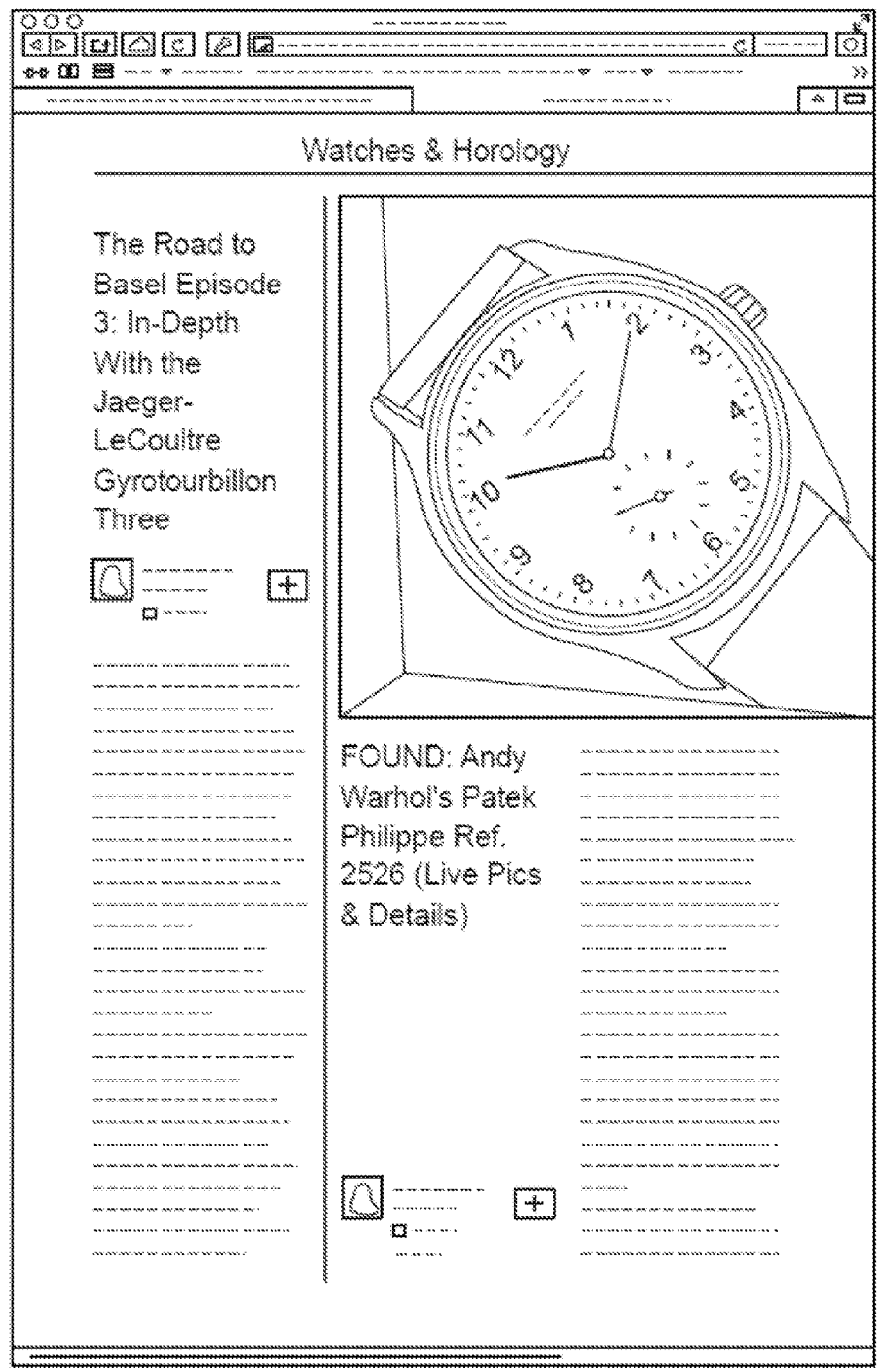
Figure 5D:
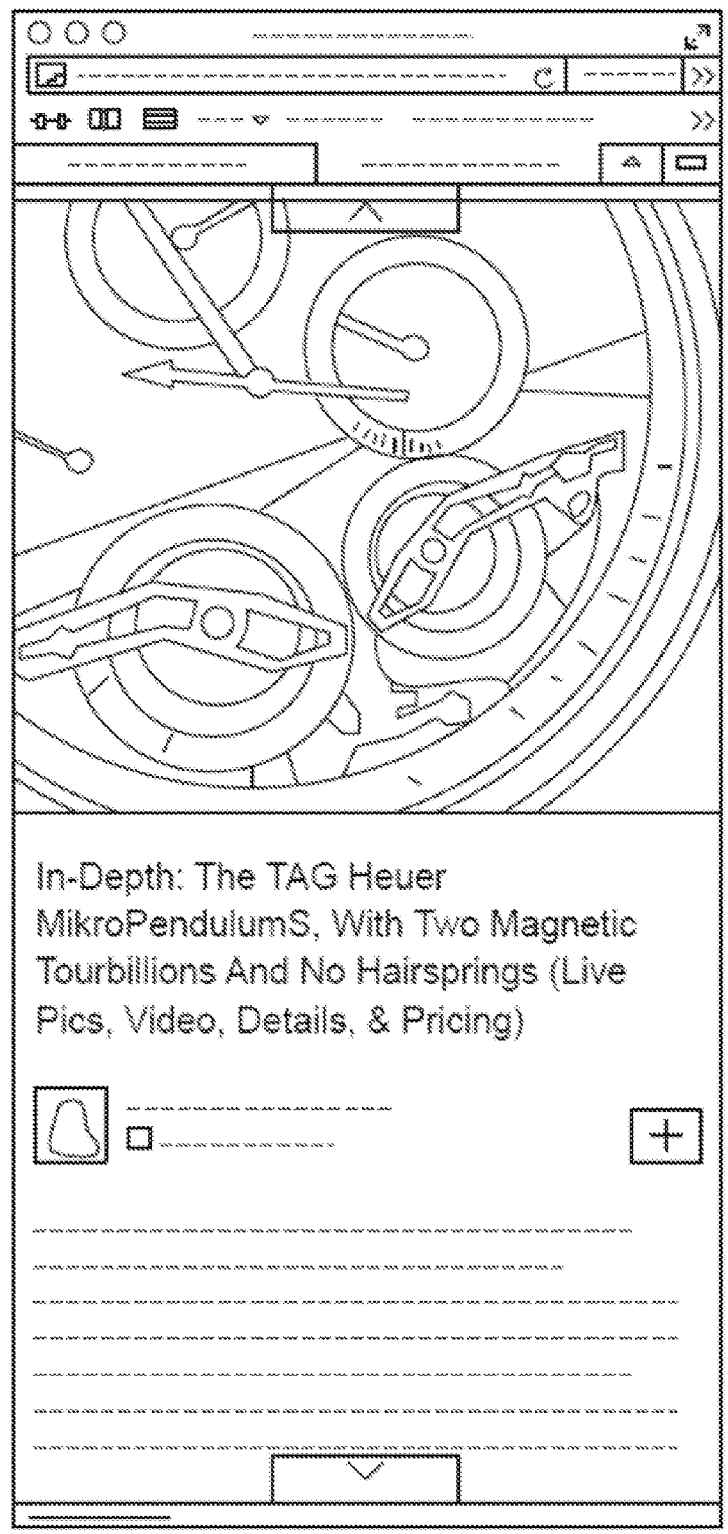

FIG. 5A is an example presentation of content items in a digital magazine using an adjustable page template as a display area is modified. In the example shown by FIG. 5A, a section 505 is generated and displayed on a display device 132 of a client device 130 based on a selected page template. The section 505 labeled, "Watches & Horology," includes display regions 510A, 510B, 510C, 510D, and 510E. As previously described, each display region presents one or more content items having locations relative to each other specified by the display regions in the selected page template. One or more display regions may be modified or hidden from view based on inputs received from a user of the client device 130. For example, a display region is modified when a gesture moving simulating movement of a dimension of a display area of the display device 132 from an initial position to a modified position. As a more specific example, if a gesture simulating moving a display area dimension 520 from an initial position 520A to a secondary position 520B is received via the client device 130 and communicated to an application executing on the client device 130 and associated with the digital magazine server 140, display region 510E and content items included in display region 510E are hidden from view, as shown in FIG. 5B. In other embodiments, content items included display region 510E may be redistributed to one or more additional display regions that remain visible when a gesture simulating reducing display area dimension 520 from an initial position 520A to a secondary position 520B. Further modifications to the display area in which the section 505 is displayed, may result in an incremental reduction in the number of remaining visible display regions until a minimum number of display regions, specified by the selected page template, are displayed. For example, various modifications to display area dimension 520 reduce the number of display regions 510 presented by the section 505 from five display regions to three display regions to two display regions, as shown in FIG. 5C, and ending with a single display region remaining visible, as shown in FIG. 5D. An additional display area dimension 525 may be modified in a similar manner as display area dimension 520. For example, display area dimension 520 is a horizontal dimension and additional display area dimension 525 is a vertical dimension.

Figure 5E:
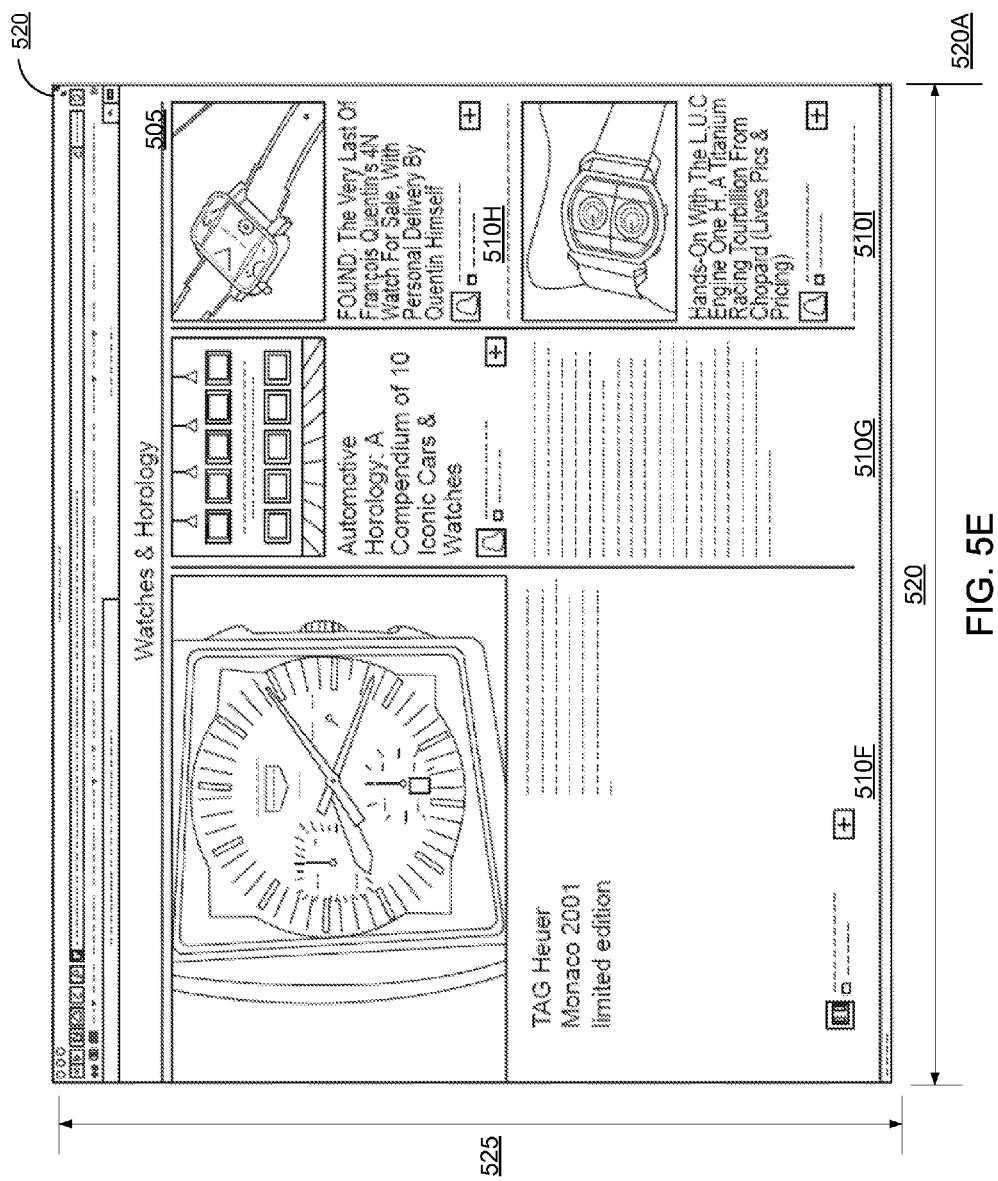
Figure 5F:
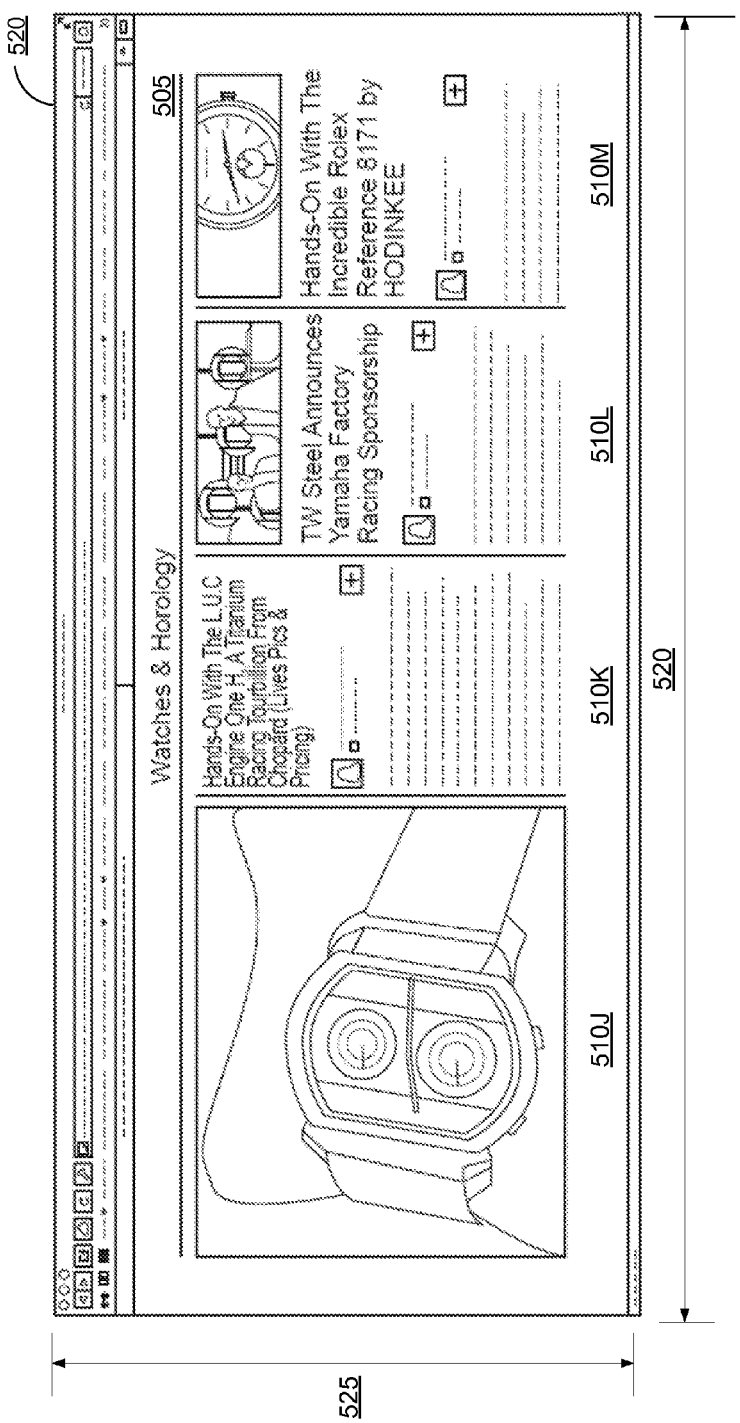

For example, as shown in FIG. 5E, presentation of content items as a display area dimension 520, 525 is modified is based on the page template selected for presentation of the content items. For example, a selected page template redistributes content items from their initial display regions 510F, 510G, 510H, and 510I to alternative display regions 510J, 510K, 510L, and 510M when a display area dimension 520, 525 is modified. In another embodiment, the selected page template hides content items within one or more display regions 510 from view when a display area dimension 520, 525 is modified as shown in FIG. 5F. Alternatively, the digital magazine server 140, or an application executing on the client device 130 and associated with the digital magazine server 140, selects an additional page template for presenting additional content items if a display area dimension 520, 525 is modified (e.g., if a display area dimension 520, 525 is increased). This allows dynamic modification of a section's layout based on modifications to the display area available for presenting the section, presenting content items in a layout best suited to increase user engagement with the content items.

Figure 6:
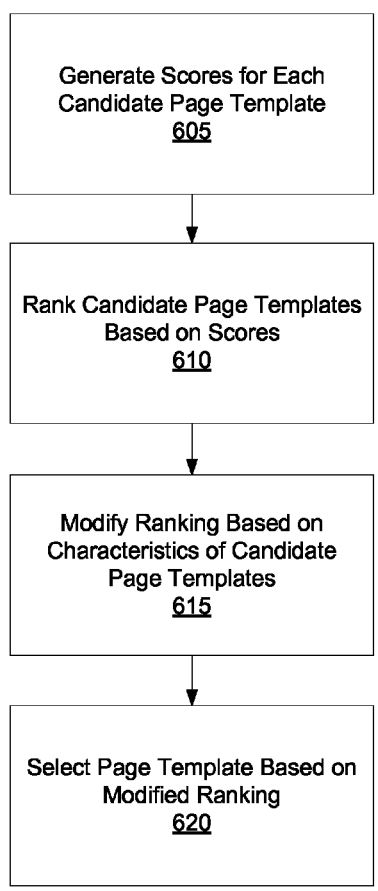
FIG. 6 is a flow chart of a method for selecting a page template for presenting content items in a digital magazine, in accordance with an embodiment of the invention.

FIG. 6 is a flow chart of one embodiment of a method for selecting 420 a page template for presenting content items in a digital magazine. In the embodiment shown by FIG. 6, scores for each candidate page template are generated 605. Various criteria may be used to generate 605 a score for a candidate page template. For example, a score for a candidate template is based on sub-scores calculated for various display regions within the candidate template that provide a measure of the amount of modification to a content item for presentation in a display region within the candidate template. In one embodiment, a greater amount of modification to a content item (e.g., rescaling, cropping, rotating, etc.) to present the content item in a display region results in a lower sub-score for the display region; similarly, a reduced amount of modification to a content item for presentation in a display region results in a higher sub-score for the display region. The sub-scores for various display regions in a page template are combined to determine the score for the page template. Additionally, display regions within a page template may be associated with types of content items, and the score of the page template may be based in part on a number of content items to be presented having a type that matches a type of content item associated with a display region within the page template. Further examples of generating 605 a score for a candidate page template are provided in U.S. patent application Ser. No. 13/096,989, filed on Apr. 28, 2011, which is incorporated by reference herein in its entirety.

The candidate page templates are ranked 610 based on their associated score. For example, candidate page templates having a higher score have a higher position in the ranking. The ranking of candidate page templates is modified 615 based on one or more characteristics of the candidate page template to increase the likelihood of diverse page templates being used to present content items. For example, the scores of one or more candidate page templates are modified based on characteristics of the candidate page templates, and the modified scores are used to modify 615 the position of various candidate page templates in the ranking. This allows the digital magazine to provide a diverse presentation of content items to increase the likelihood of users accessing or interacting with the digital magazine.

For example, a score associated with a candidate page templates are modified based on a time interval when the candidate page template was previously used to present content items. In one embodiment, a candidate page template's score is reduced if the candidate page template was previously selected within a threshold time interval of a current time. The candidate page template's score may be reduced by an amount that is inversely proportional to the time interval between the current time and a prior selection of the candidate page template for content item presentation. For example, scores of candidate page templates selected within a threshold time interval from the current time are reduced by a greater amount than scores of candidate page templates selected greater than the threshold time interval. Similarly, scores of candidate page templates previously selected greater than a threshold time interval from the current time may be increased, which places these candidate page templates in a higher position within the ranking and increases the likelihood of their selection.

Additional characteristics of a candidate page template may be used to modify a score associated with the candidate page template, which modifies its position within the ranking. For example, scores associated with candidate page templates having a specified number of display regions or less than a threshold number of content regions are increased and the ranking is modified 615 accordingly. As another example, if the content items to be presented include at least one content item having a specified type, a score associated with a page template including a single display region associated with the specified type of content item is increased; hence, a page template including a single display region for presenting an image may have its score increased to modify 615 its position in the ranking, increasing the likelihood of its selection if content items to be presented include at least one image.

Additionally, the ranking may be modified 615 based on a sequence of page templates provided by a source 110 or by the user being presented with the content items. For example, the sequence of page templates identifies an order for selecting page templates for presentation, so a score associated with the initial page template in the sequence is increased to raise its position in the ranking and to increase the likelihood of its selection. After the initial page template is selected, an indication that the initial page template was selected is generated and a score associated subsequent page template in the sequence of page templates is increased when a subsequent request to present content items is received by the digital magazine server 140 or by a digital magazine application executing on a client device 130. This allows a user or a source 110 to customize presentation of content items to the user.

From the modified ranking, a page template is selected 620 from the candidate page template. As described above in conjunction with FIG. 4, a section displaying the one or more content items is generated 425 using the selected candidate page template. While various examples of modifying 615 a ranking of candidate page templates are provided above in conjunction with FIG. 6, any suitable method for modifying the ranking may be used. For example, rather than modifying the scores associated with various candidate page templates, the position of various page templates in the ranking may be modified 615 while the scores associated with the page templates remain unchanged.

Section Generation Using Page Templates and Sub-Templates

Figure 7:
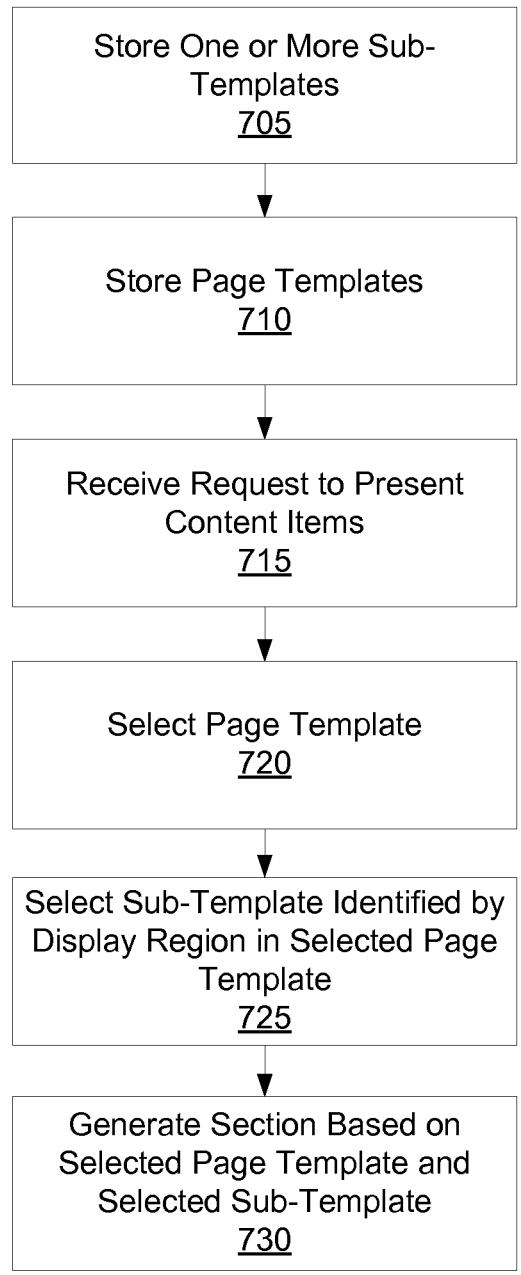
FIG. 7 is a flow chart of a method for presenting content items in a digital magazine using a page template and a sub-template associated with the page template, in accordance with an embodiment of the invention.

FIG. 7 is a flow chart of one embodiment of a method for presenting content items in a digital magazine using a page template and a sub-template associated with the page template. The digital magazine server 140, or a digital magazine application executing on a client device 130, stores 705 one or more sub-templates. For example, one or more sub-templates are stored in the template store 215. As described above in conjunction with FIG. 2, a sub-template describes a spatial arrangement of content items relative to each other when presented by a client device 130. A sub-template includes one or more display regions that are each configured to present one or more content items. The position of display regions relative to each other in a page template specify the position of content items relative to each other in a page generated from the page template. Similarly, the size of a display region in a sub-template indicates the size with which a content item is presented. Additionally, a display region of a sub-template may identify a sub-template, so content items within the display region are presented according to the relative positioning and sizing specified by the identified sub-template.

One or more page templates, as described above in conjunction with FIGS. 2-4 are stored 710 in the template store 215 or in a local storage device included in a client device 130. As described above in conjunction with FIGS. 2-4, a page template includes one or more display regions each configured to present one or more content items and describing a spatial arrangement of content items relative to each other on a section ("layout") for presentation by a client device 130. The position of display regions relative to each other in a page template specify the position of content items relative to each other in a section generated from the page template. Similarly, the size of a display region in a page template indicates the size with which a content item is presented.

A page template may include a display region that identifies a sub-template to present content items within the display region according to the relative positioning and sizing specified by the identified sub-template. In one embodiment, a display region of a page template identifies a specific sub-template; when a section is generated using the page template, content items included in the display region are presented using relative positioning and sizing information in the specific sub-template. Alternatively, a display region of a page template identifies that content items in the display region are presented based on a sub-template; when the page template is selected, a sub-template is selected from the sub-template and the selected sub-template is used to present content items. In another embodiment, a display region of a page template identifies a group of sub-templates; when the page template is selected, a sub-template from the identified group is selected and content items are presented in the display region based on positioning and sizing information included in the selected sub-template.

The digital magazine server 140, or a digital magazine application executing on a client device 130, receives 715 a request to present content items from one or more sources 110 via a digital magazine. Information describing the display area of the client device 130 is included in the request, as described above in conjunction with FIG. 4. For example, physical dimensions of a display device 132 of the client device 130 are included in the request.

Based at least in part on the display area of the client device, a page template is selected 720 from the stored page templates. Selection of page templates is further described above in conjunction with FIGS. 4 and 6. For example, candidate page templates are identified based at least in part on the display area of the client device and each candidate page template is scored based on characteristics of the candidate page templates, characteristics of the one or more content items, and the display area. Based on the scores, a display page template is selected 620 from the candidate page templates.

If the selected page template includes a display region identifying a sub-template, a display sub-template is selected 725 from the stored sub-templates. If the display region in the selected page template identifies a specific sub-template, the specific sub-template is selected 725. However, if the display region in the selected page template indicates use of a sub-template to present content items, at least a subset of the stored sub-templates are ranked based on the display area of the client device 130 and characteristics of the one or more content items to be presented. For example, each stored sub-templates are scored based on the amount of modification to one or more content items to present the content items in display regions of a sub-template and the sub-templates are ranked based on their scores. A sub-template is selected 725 based on the ranking. In some embodiments, the display region in the selected page template identifies a group of sub-templates, so a sub-template is selected 725 from the identified group of sub-templates; for example, each sub-template in the group is scored and a display sub-template is selected from the group based on the scores. The methods for selecting a page template described above in conjunction with FIGS. 4 and 6 may similarly be used to select 725 a display sub-template.

Using the selected page template and display sub-template, the digital magazine server 140 or a digital magazine application executing on the client device 130 generates 730 a section including the content items from one or more sources 110. As described above in conjunction with FIG. 4, the generated section includes content regions presenting one or more content items having locations relative to each other specified by the display regions in the selected page template. Similarly, a content region corresponding to the display region identifying use of a sub-template for content item presentation includes sub-content regions having relative positioning and sizing specified by display regions in the selected sub-template. As described above in conjunction with FIG. 4, if the display area in which the generated section is modified, an alternative page template and display sub-template may be selected using the above-described method and the modified display area, allowing presentation of content items to be dynamically modified as the display area changes.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a digital magazine, the method comprising:
   storing a plurality of sub-templates, each sub-template including one or more regions specifying a layout of content items to be placed in the one or more regions;
   storing a plurality of page templates, each page template including one or more regions specifying a layout of content items to be placed in the more regions, at least one page template including a region that includes a sub-template;
   selecting a page template from the page templates based at least in part on a portion of the display area of the client device and one or more characteristics of content items from one or more sources, the page template including the region that includes the sub-template;
   ranking one or more sub-templates for the region of the selected page template based on the display area of the client device and characteristics of one or more content items for presentation in the display area;
   selecting a display sub-template for the region of the selected page template based at least in part on the ranking; and
   generating a section of the digital magazine for presentation via the client device, the section including one or more content regions including content items in the region of the selected page template placed in positions within the region of the selected page template specified by the display sub-template.

2. The method of claim 1, wherein the section includes content items presented in additional content regions having positions relative to each other based on one or more regions in the selected page template.

3. The method of claim 1, wherein generating the section of the digital magazine for presentation via the client device comprises:
   retrieving a sub-template identified by a region included in the display sub-template; and
   arranging content items within the region included in the display sub-template based on one or more regions included in the retrieved sub-template.

4. The method of claim 1, wherein ranking one or more sub-templates for the region based on the display area of the client device and characteristics of one or more content items for presentation in the display area comprises:
   generating a score for each sub-template, a score for a sub-template based on an amount of modification to one or more content items to present the one or more content items in regions included in the sub-template; and
   ranking the one or more sub-templates based on the generated scores.

5. The method of claim 1, further comprising:
   receiving an updated display area of the client device;
   selecting an alternative page template from the page templates based at least in part on the display area of the client device and one or more characteristics of the content items from the one or more sources, the page template including a region indicating use of an alternative sub-template to present the content item;
   ranking one or more sub-templates for the region indicating use of the alternative sub-template based on the updated display area of the client device and characteristics of one or more content items for presentation in the display area;
   selecting an alternative display sub-template for the region indicating use of the alternative sub-template based at least in part on the ranking; and modifying the section of the digital magazine to include one or more content regions including content items positioned in the region based on regions in the alternative display sub-template.

6. A method for generating a digital magazine, the method comprising:
    storing a sub-template including one or more regions specifying a layout of content items to be placed in the one or more regions;
    storing a template including one or more regions, each region configured to present one or more content items, and at least one region including the sub-template;
    receiving a request to present one or more content items from one or more sources in a digital magazine;
    determining a display area of a client device for presenting the content items;
    selecting the page template based on a portion of the display area of the client device and one or more characteristics of the content items from the one or more sources;
    retrieving the sub-template included in the region in the template;
    generating content regions including one or more of the content items based on the one or more regions in the template, the region including the sub-template including content regions based on the sub-template; and
    generating a section of the digital magazine for presentation via the client device, the section presenting the generated content regions based on the sub template in a location associated with region including the sub-template.

7. The method of claim 6, wherein the section includes content items presented in additional content regions having positions relative to each other based on one or more regions in the page template.

8. The method of claim 6, wherein generating the section of the digital magazine for presentation via the client device comprises:
    retrieving a sub-template identified by a region included in the sub-template; and
    arranging content items within the region included in the sub-template based on one or more regions included in the retrieved sub-template.

9. A method for generating a digital magazine, the method comprising:
    storing a plurality of sub-templates, each sub-template including one or more regions specifying a layout of content items to be placed in the one or more regions;
    storing a plurality of page templates, each page template including one or more regions, each region configured to present one or more content items, a page template including a region indicating use of a sub-template from a group of sub-templates to present a content item;
    receiving a request to present one or more content items from one or more sources in a digital magazine;
    determining a display area of a client device for presenting the content items;
    selecting the page template including the region indicating use of the sub-template from the group of sub-templates based at least in part on a portion of the display area of the client device and one or more characteristics of the content items from the one or more sources;
    retrieving the group of sub-templates indicated by the region of the selected page template;
    selecting a display sub-template from the group of sub-templates based least in part on one or more content items for presentation in the display area; and
    generating a section of the digital magazine for presentation via the client device, the section including one or more content regions including content items in the region placed in positions specified by the display sub-template.

10. The method of claim 9, wherein the section includes content items presented in additional content regions having positions relative to each other based on one or more regions in the selected page template.

11. The method of claim 9, wherein generating the section of the digital magazine for presentation via the client device comprises:
    retrieving a sub-template identified by a region included in the display sub-template; and
    arranging content items within the region included in the display sub-template based on one or more regions included in the retrieved sub-template.

12. The method of claim 9, wherein selecting the display sub-template from the group of sub-templates based least in part on characteristics of one or more content items for presentation in the display area comprises:
    ranking the sub-templates in the group of sub-templates based on the display area of the client device and characteristics of one or more content items for presentation in the display area; and
    selecting the display sub-template based at least in part on the ranking.

13. The method of claim 12, wherein ranking one or more sub-templates for the region based on the display area of the client device and characteristics of one or more content items for presentation in the display area comprises:
    generating a score for each sub-template, a score for a sub-template based on an amount of modification to one or more content items to present the one or more content items in regions included in the sub-template; and
    ranking the one or more sub-templates based on the generated scores.

14. The method of claim 9, further comprising:
    receiving an updated display area of the client device;
    selecting an alternative page template including an additional region indicating use of the sub-template from the group of sub-templates based at least in part on the display area of the client device and one or more characteristics of the content items from the one or more sources;
    retrieving the group of sub-templates indicated by the additional region;
    selecting a display sub-template for use by the additional region from the group of sub-templates based least in part on the display area of the client device and characteristics of one or more content items for presentation in the display area;
    modifying the section of the digital magazine to include one or more content regions including content items positioned in the additional region based on regions in the display sub-template for use by the additional region.

* * * * *